United States Patent
Ono

(10) Patent No.: US 7,440,021 B2
(45) Date of Patent: Oct. 21, 2008

(54) IMAGE CAPTURING APPARATUS AND AN IMAGE CAPTURING METHOD

(75) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 720 days.

(21) Appl. No.: 11/115,304

(22) Filed: Apr. 27, 2005

(65) Prior Publication Data

US 2005/0253956 A1 Nov. 17, 2005

(30) Foreign Application Priority Data

Apr. 30, 2004 (JP) .............................. 2004-136398

(51) Int. Cl.
*G03B 7/00* (2006.01)
*H04N 5/235* (2006.01)
*H04N 5/262* (2006.01)
(52) U.S. Cl. ................ 348/362; 348/240.99; 348/221.1
(58) Field of Classification Search .............. 348/221.1, 348/240.99, 362–368
See application file for complete search history.

(56) References Cited

U.S. PATENT DOCUMENTS

2004/0155977 A1 * 8/2004 Clark et al. ................. 348/362

FOREIGN PATENT DOCUMENTS

JP 2001-209088 A 8/2001

* cited by examiner

*Primary Examiner*—David Ometz
*Assistant Examiner*—Tuan H Le
(74) *Attorney, Agent, or Firm*—Sughrue Mion, PLLC

(57) ABSTRACT

An image capturing apparatus includes an image capturing unit for capturing an image of an object; a light quantity storing unit for storing light quantity of the object which is outside of an image capturing region of the image capturing apparatus by corresponding the light quantity to a positional relationship between the image capturing unit and the object; an image capturing region variation detecting unit for detecting variation in the image capturing region of the image capturing unit; a positional relationship estimating unit for estimating a positional relationship between the image capturing unit and the object after the positional relationship between the image capturing unit and the object is varied on the basis of the variation in the image capturing region detected by the image capturing region variation detecting unit; and an image capturing condition control unit for controlling an image capturing condition by the image capturing unit on the basis of the light quantity stored by the light quantity storing unit, wherein the light quantity is corresponded to the positional relationship estimated by the positional relationship estimating unit.

10 Claims, 5 Drawing Sheets

IMAGE CAPTURING APPARATUS AND AN IMAGE CAPTURING METHOD

This patent application claims priority from a Japanese patent application No. 2004-136398 filed on Apr. 30, 2004, the contents of which are incorporated herein by reference.

BACKGROUND OF THE INVENTION

1. Field of the Invention

The present invention relates to an image capturing apparatus and an image capturing method. More particularly, the present invention relates to an image capturing apparatus and an image capturing method which is capable of adjusting fast image capturing conditions for an object which is in a new image capturing region in case the image capturing region is varied.

2. Description of the Related Art

Conventionally, an automatic exposure control function of an image capturing apparatus measures brightness of an image of an object which is in an image capturing region and performs exposure control by adjusting aperture, shutter speed, and the like, on the basis of the measured brightness. Further, an automatic white balance control function of the conventional image capturing apparatus measures chromaticity an object which is in an image capturing region and performs white balance control by adjusting chromaticity of each color on the basis of the measured chromaticity (cf. Japanese Patent Application Laid Open No. 2001-209088).

However, the automatic exposure control function or the white balance control function of the conventional image capturing apparatus measures brightness or chromaticity of an image of an object which is in an image capturing region and performs an exposure control or a white balance control on the basis of the measured brightness or chromaticity. Thus, in case the image capturing region is varied such as case the direction of the image capturing apparatus is quite varied, brightness or chromaticity of an image of an object which is in the image capturing region after the image capturing region is varied and then the exposure control or the white balance control should be performed. Therefore, the exposure control or the white balance control cannot be properly performed just after the image capturing region is varied and thus quality of the image captured just after the image capturing region is varied becomes worse. In other words, because the conventional automatic exposure control function or the automatic white balance control function needs a predetermined time to perform the exposure control or the white balance control for an object which is set in the image capturing region, in case a user changes fast the direction of the image capturing apparatus to capture an image of the object and an image of an object which enters into the image capturing region at high speed is captured, it is impossible to capture an image with proper exposure and white balance following the fast control of exposure and white balance for the object.

SUMMARY OF THE INVENTION

Therefore, it is an object of the present invention to provide an image capturing apparatus and an image capturing method, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an image capturing apparatus includes an image capturing unit for capturing an image of an object; a light quantity storing unit for storing light quantity of the object which is outside of an image capturing region of the image capturing apparatus by corresponding the light quantity to a positional relationship between the image capturing unit and the object; an image capturing region variation detecting unit for detecting variation in the image capturing region of the image capturing unit; a positional relationship estimating unit for estimating a positional relationship between the image capturing unit and the object after the positional relationship between the image capturing unit and the object is varied on the basis of the variation in the image capturing region detected by the image capturing region variation detecting unit; and an image capturing condition control unit for controlling an image capturing condition by the image capturing unit on the basis of the light quantity stored by the light quantity storing unit, wherein the light quantity is corresponded to the positional relationship estimated by the positional relationship estimating unit.

The image capturing condition control unit may control exposure adjustment on the basis of the light quantity stored by the light quantity storing unit.

The light quantity storing unit may store light quantity of each color of the object which is outside of the image capturing region of the image capturing unit by corresponding the light quantity of each color to the positional relationship between the image capturing unit and the object, and the image capturing condition control unit may control white balance adjustment of the image capturing unit on the basis of the light quantity of each color stored by the light quantity storing unit.

The image capturing apparatus may further include a light quantity measuring unit for measuring the light quantity of the object, wherein the image capturing unit may capture an inside-zoom-image which is an image in the image capturing region out of a whole image of the object by electronic zooming, the light quantity measuring unit may measure the light quantity of the object comprised by an outside-zoom-image which is the rest of the whole image except the inside-zoom-image, the light quantity storing unit may store the light quantity of the outside-zoom-image of the object by corresponding it to the positional relationship between the image capturing unit and the object, and the image capturing condition control unit may control the image capturing condition of the image capturing unit on the basis of the light quantity of the object comprised by the outside-zoom-image and stored by the light quantity storing unit in case the image capturing region of the image capturing unit is varied.

The image capturing apparatus may further include a light quantity measuring unit for measuring the light quantity of the object, wherein the light quantity storing unit may store the light quantity measured by the light quantity measuring unit in the past by corresponding it to the positional relationship between the image capturing unit and the object, and the image capturing condition control unit may control the image capturing condition of the image capturing unit on the basis of the light quantity measured in the past and stored by the light quantity storing unit in case the image capturing region of the image capturing unit is varied.

The image capturing apparatus may further include a light quantity estimating unit for estimating light quantity of the object after the positional relationship between the image capturing unit and the object is varied, wherein the light quantity storing unit may store the light quantity measured by the light quantity measuring unit in the past by corresponding it to a time when the light quantity measuring unit measured the light quantity, the light quantity estimating unit may estimate the light quantity of the object after the positional relationship between the image capturing unit and the object on the basis of the light quantity measured by the light quantity measuring unit in the past and stored by the light quantity storing unit, and the image capturing condition control unit may control the image capturing condition of the image capturing unit on the basis of the light quantity measured by the light estimating unit.

The image capturing region variation detecting unit may detect the variation in image capturing region of the image capturing unit by detecting a movement of the image capturing unit.

The image capturing unit may capture a plurality of images successively, and the image capturing region variation detecting unit may detect the variation in image capturing region of the image capturing unit by comparing the plurality of images captured successively by the image capturing unit.

The light quantity storing unit may store light quantity for an object which is outside of the image capturing region of the image capturing unit by corresponding it to a direction of the image capturing unit, the image capturing region variation detecting unit may detect a variation in the direction of the image capturing unit, the positional relationship estimating unit may estimate the direction of the image capturing unit after the direction of the image capturing unit is varied on the basis of the variation of the direction of the image capturing unit detected by the image capturing region variation detecting unit, and the image capturing condition control unit may control the image capturing condition of the image capturing unit on the basis of the light quantity of the object, which is outside of the image capturing region of the image capturing unit, stored by the light quantity storing unit and corresponded to the direction of the image capturing unit estimated by the positional relationship estimating unit.

According to the second aspect of the present invention, an image capturing method includes the steps of: storing light quantity of an object which is outside of an image capturing region of an image captured by an image capturing apparatus in a light quantity storing unit by corresponding the light quantity to a positional relationship between the image capturing apparatus and the object; detecting a variation in the image capturing region of the image capturing apparatus; estimating the positional relationship between the image capturing apparatus and the object after the image capturing region of the image capturing apparatus is varied on the basis of the variation in the image capturing region detected; controlling an image capturing condition of the image capturing apparatus on the basis of the light quantity stored in the light quantity storing unit and corresponded to the estimated positional relationship; and capturing an image of the object on the basis of the image capturing condition.

The summary of the invention does not necessarily describe all necessary features of the present invention. The present invention may also be a sub-combination of the features described above. The above and other features and advantages of the present invention will become more apparent from the following description of the embodiments captured in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
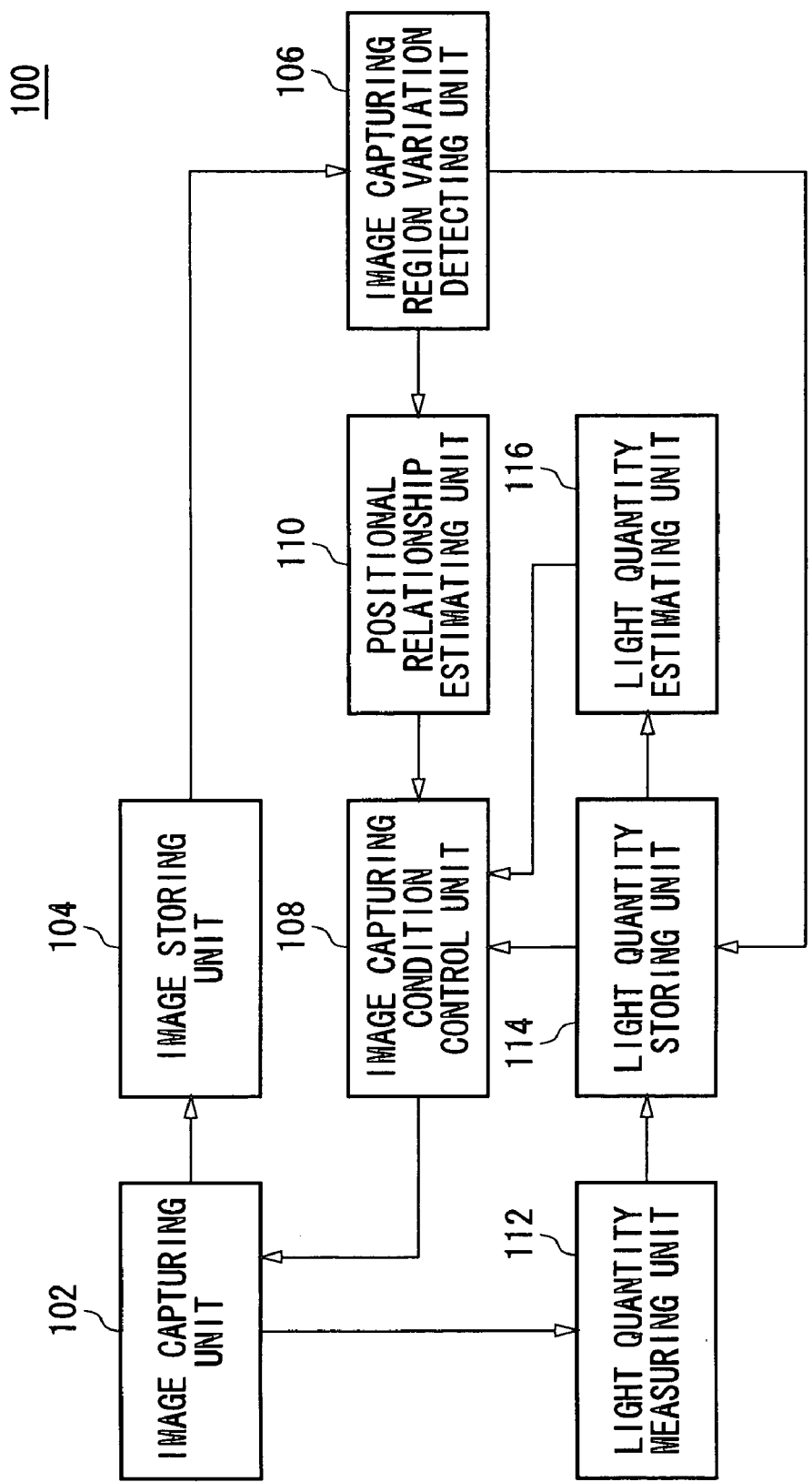
FIG. 1 shows an example of the configuration of an image capturing apparatus 100.

FIG. 1 shows an example of the configuration of an image capturing apparatus 100. An image capturing region is a region of an object of which image is captured on a liquid crystal monitor or a finder. An object of the present embodiment is to perform fast control of image capturing conditions such as exposure, white balance, etc. accurately for an object which enters the image capturing region in case the image capturing region is varied according to variation of the direction of the image capturing apparatus 100, motion of an object, and the like. Thus, even in case the direction of the image capturing apparatus 100 is varied fast to capture an image of an object and an image of an object which enters into the image capturing region at high speed is captured, it is possible to capture an image with a good quality of which exposure and white balance are properly controlled.

The image capturing apparatus 100 includes an image capturing unit 102, an image storing unit 104, an image capturing region variation detecting unit 106, an image capturing condition control unit 108, a positional relationship estimating unit 110, a light quantity measuring unit 112, a light quantity storing unit 114, and a light quantity estimating unit 116. The image capturing unit 100 may be a digital still camera, a digital movie camera, and a mobile phone with a function of a camera.

The image capturing unit 102 receives light emitted from an object by an image capturing device such as a CCD and captures an image of the object which is in the image capturing region. At this time, the image capturing unit 102 adjusts image capturing conditions by the automatic exposure control function and white balance control function on the basis of control of the image capturing condition control unit. Then, the image storing unit 104 stores the image captured by the image capturing unit 102. Here, the image storing unit 104 stores not only an image captured when a user pushes a release button but also an image of an object emitting light received by the image capturing device of the image capturing unit 102.

The image capturing region variation detecting unit 106 detects variation in the image capturing region of the image capturing unit 102 on the basis of a plurality of images successively captured by the image capturing unit 102 and stored in the image storing unit 104. Specifically, the image capturing region variation detecting unit 106 detects the variation in the image capturing region of the image capturing unit 102 by comparing the plurality of images successively captured by the image capturing unit 102, the so-called optical flow. Further, according to another example, the image capturing region variation detecting unit 106 may include a gyroscope and detect variation in the image capturing region of the image capturing unit 102 by detecting motion of the image capturing apparatus 100.

The image capturing region variation detecting unit 106 detects the variation in the image capturing region of the image capturing unit 102 by the optical flow or the gyroscope and detects variation in relative position of the image capturing unit 102 and an object on the basis of the detected variation in the image capturing region of the image capturing unit 102. For example, the image capturing region variation detecting unit 106 detects variation in the direction in which the image capturing unit 102 turns to the object. Here, the image capturing region is a region of an object emitting light toward the image capturing device of the image capturing unit 102, that is, a region of which image can be captured by the image capturing unit 102. The image capturing region is determined by the direction and the position of the image capturing unit 102 and the position of the object. Therefore, it is possible to detect a positional relationship between the image capturing unit 102 and the object by the variation in the image capturing region. Further, in case the image capturing unit 102 captures an image by using an electronic zooming, the image capturing region may be the region which is in the zoom.

The light quantity storing unit 114 stores light quantity of an object around the image capturing apparatus 100 correspondingly to the positional relationship between the image capturing unit 102 and the object. The light quantity storing unit 114 stores not only light quantity of an object which is in the image capturing region of which image is captured by the image capturing unit 102 but also light quantity of an object which is outside of the image capturing region correspondingly to the positional relationship between the image capturing unit 102 and the object. For example, the light quantity storing unit 114 stores the light quantity of an object which is inside or outside of the image capturing region correspondingly to the direction of the image capturing unit 102. Specifically, the light quantity storing unit 114 sets a predetermined direction from the image capturing unit 102 to a reference direction and stores light quantity of an object which exists in each direction at an angle of the horizontal direction and the vertical direction from the reference direction correspondingly to the direction.

Further, the light quantity storing unit 114 may store brightness of an object which is within a range of substantially the same size as that of the image capturing region of the image capturing unit 102 as a light quantity of the object correspondingly to the positional relationship of the image capturing unit 102 and the object. The light quantity storing unit 114 may store light quantity of each color (R, G, B) of the object for each pixel correspondingly to the positional relationship between the image capturing unit 102 and the object.

The light quantity measuring unit 112 measures the light quantity of the object on the basis of the image captured by the image capturing unit 102. In case the image capturing unit 102 using the electronic zooming captures an inside-zoom-image of the whole image which is an image located in the image capturing region, the light quantity measuring unit 112 also measures light quantity of an object included in an outside-zoom-image which is an image other than the inside-zoom-image of the whole image. Further, the light quantity measuring unit 112 measures brightness of an object which is within a range of substantially the same size as that of the image capturing region of the image capturing unit 102 and light quantity of each color (R, G, B) of the object for each pixel.

Then, the light quantity storing unit 114 stores the light quantity of an object around the image capturing apparatus 100 measured by the light quantity measuring unit 112 including light quantity of an object of the outside-zoom-image, correspondingly to the positional relationship between the image capturing unit 102 and the object. Further, even in case the image capturing unit 102 does not capture an image on the basis of an instruction such as the user's pressing the release button, the light quantity measuring unit 112 measures successively light quantity of objects around the image capturing apparatus 100 and stores the light quantity in the light quantity storing unit 114. In other words, the light quantity storing unit 114 also stores the light quantity previously measured by the light quantity measuring unit 112 correspondingly to the positional relationship between the image capturing unit 102 and the object. Further, the light quantity storing unit 114 may store the light quantity measured previously by the light quantity measuring unit 112 correspondingly to the time when the light quantity measuring unit 112 measures the light quantity.

The positional relationship estimating unit 110 estimates a positional relationship between the image capturing unit 102 and an object after the image capturing region of the image capturing unit 102 is varied on the basis of the variation in the image capturing region detected by the image capturing region variation detecting unit 106. Specifically, the positional relationship estimating unit 110 estimates a direction of the image capturing unit 102 after the direction of the image capturing unit 102 is varied on the basis of the variation in the direction of the image capturing unit detected by the image capturing region variation detecting unit 106. Further, the light quantity estimating unit 116 estimates light quantity of the object after the positional relationship between the image capturing unit 102 and the object is varied.

The image capturing condition control unit 108 controls image capturing conditions of the image capturing unit 102 on the basis of the light quantity of the object stored in the light quantity storing unit 114 correspondingly to the positional relationship between the image capturing unit 102 and the object estimated by the positional relationship estimating unit 110. Specifically, the image capturing condition control unit 108 controls the exposure adjustment by the image capturing unit 102 on the basis of the light quantity of the object stored in the light quantity storing unit 114 and the white balance adjustment by the image capturing unit 102 on the basis of the light quantity of each color of the object stored in the light quantity storing unit 114.

For example, the image capturing condition control unit 108 controls the image capturing conditions of the image capturing unit 102 on the basis of the light quantity of the object which is outside of the image capturing region of the image capturing unit 102 measured by the light quantity measuring unit 112. In the meantime, the image capturing condition control unit 108 may control the image capturing conditions on the basis of the light quantity of the object included in the outside-zoom-image stored in the light quantity storing unit 114 in case the image capturing region of the image capturing unit 102 is varied. The image capturing condition control unit 108 may control the image capturing conditions on the basis of the light quantity of the object which is previously measured by the light quantity measuring unit 112 and stored in the light quantity storing unit 114 in case the image capturing region of the image capturing unit 102 is varied.

As above, the direction of the image capturing apparatus 100 of the present embodiment is varied by the user and thus the image capturing region is varied. The image capturing apparatus 100 estimates that an object which is outside of the image capturing region would enter the image capturing region and makes exposure and white balance follow up the light quantity of the object which is to enter the image capturing region, that is, the object which is outside of the image capturing region. By this, in case the user changes fast the direction of the image capturing apparatus 100 to capture an image of an object and an image of an object which enters into the image capturing region at high speed is captured, it is possible to capture an image with proper exposure and white balance following the fast control of exposure and white balance for the object and to capture an image of good quality.

Figure 2:
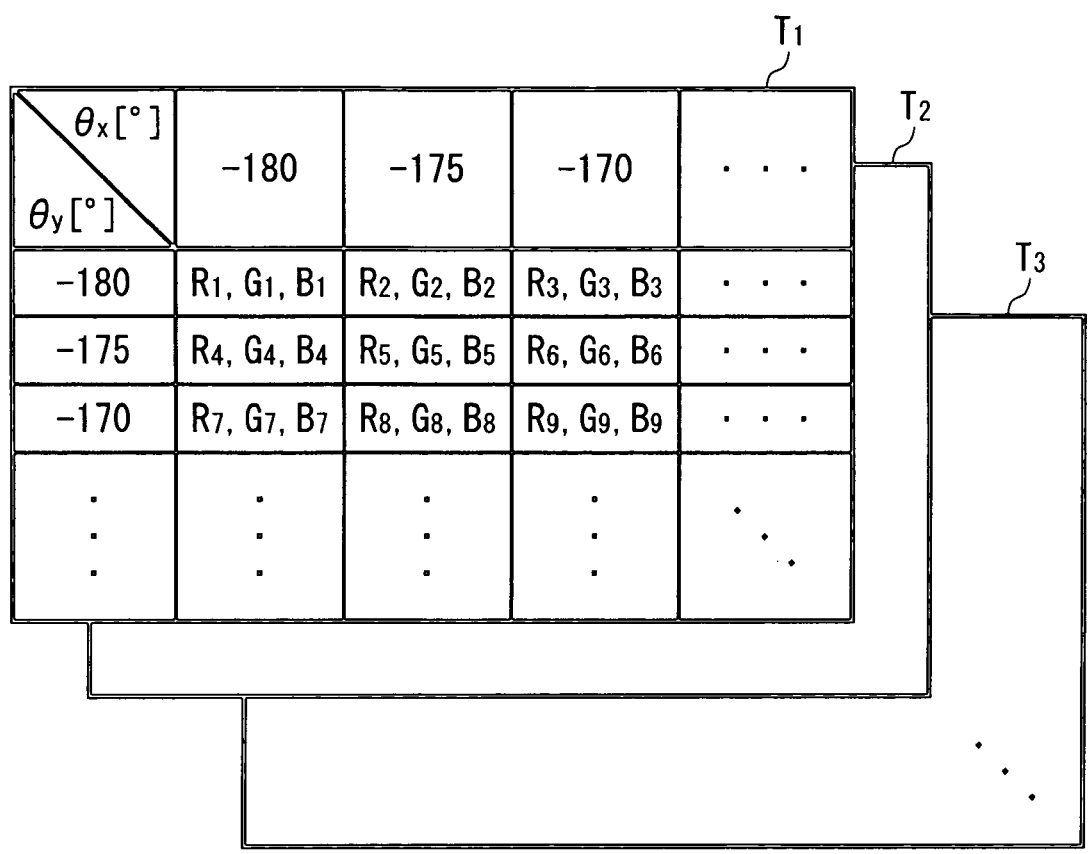
FIG. 2 shows an example of data stored in a light quantity storing unit 114.

FIG. 2 shows an example of data stored in the light quantity storing unit 114. The light quantity storing unit 114 stores light quantity of each color of an object which is located in each direction of the horizontal direction ($\theta x$) and the vertical direction ($\theta y$) with respect to a reference direction of the image capturing unit 102. Further, the light quantity storing unit 114 stores the light quantity of each color of the object located in each direction at each time that the light quantity measuring unit 112 measures the light quantity of the object.

Further, it is preferable that the light quantity measuring unit 112 always measures light quantity of the object from an image captured by the image capturing unit 102 regardless of whether or not the user instructs to capture an image and the light quantity storing unit 114 stores light quantity of each color of an object located in each direction which is newly measured by the light quantity measuring unit 112 correspondingly to the time of being measured. By this, it is possible to fast detect an object which enters the image capturing region and to get control of the exposure adjustment and the white balance adjustment started in advance. Further, by estimating light quantity of objects located in all directions around the image capturing apparatus 100 in case of capturing an image just after the direction of the image capturing apparatus 100 is varied in not only the horizontal direction but also the vertical direction or an inclined direction, it is possible to fast perform exposure adjustment and white balance adjustment for an object which enters the image capturing region.

Figure 3:
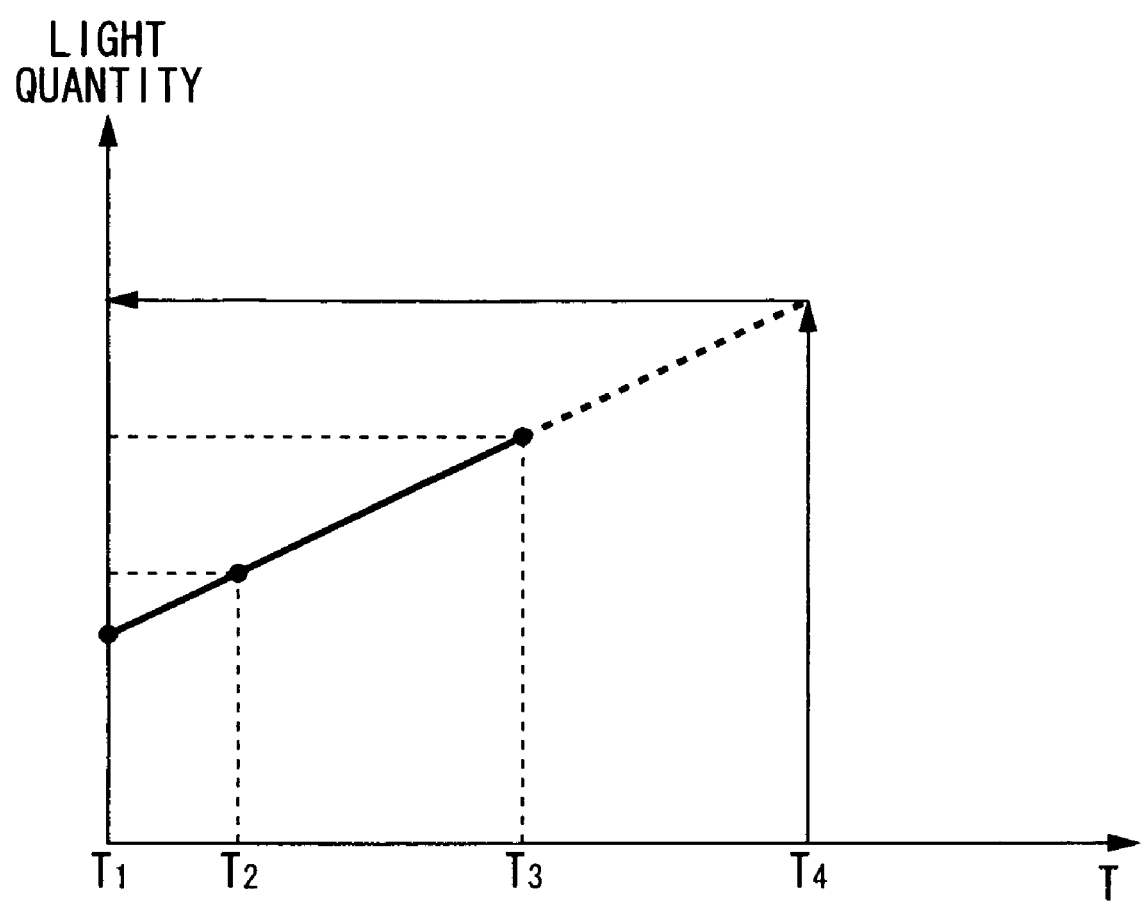
FIG. 3 shows an example of a method for estimating light quantity of an object.

FIG. 3 shows an example of a method for estimating light quantity of an object by the light quantity estimating unit 116 according to the present embodiment. The light quantity estimating unit 116 estimates light quantity of an object at a time T4 after the positional relationship between the image capturing unit 102 and the object is varied on the basis of the light quantity previously measured by the light quantity measuring unit 112 and stored by the light quantity storing unit 114 for each time (T1, T2, T3,). In other words, the light quantity estimating unit 116 estimates variation in brightness or chromaticity of image capturing environment as time goes by. For example, in case, for example, an image is captured out of doors when the sun sets, variation in light quantity of the object due to the sunset is estimated. Then, the image capturing condition control unit 108 controls the exposure adjustment and the white balance adjustment on the basis of the light quantity of the object estimated by the light quantity estimating unit 116.

As above, by estimating variation in light quantity of an object as time goes by, it is possible to properly perform exposure adjustment and white balance adjustment for an object which is outside of the image capturing region even if time passes after light quantity of the object is acquired and stored.

Figure 4:
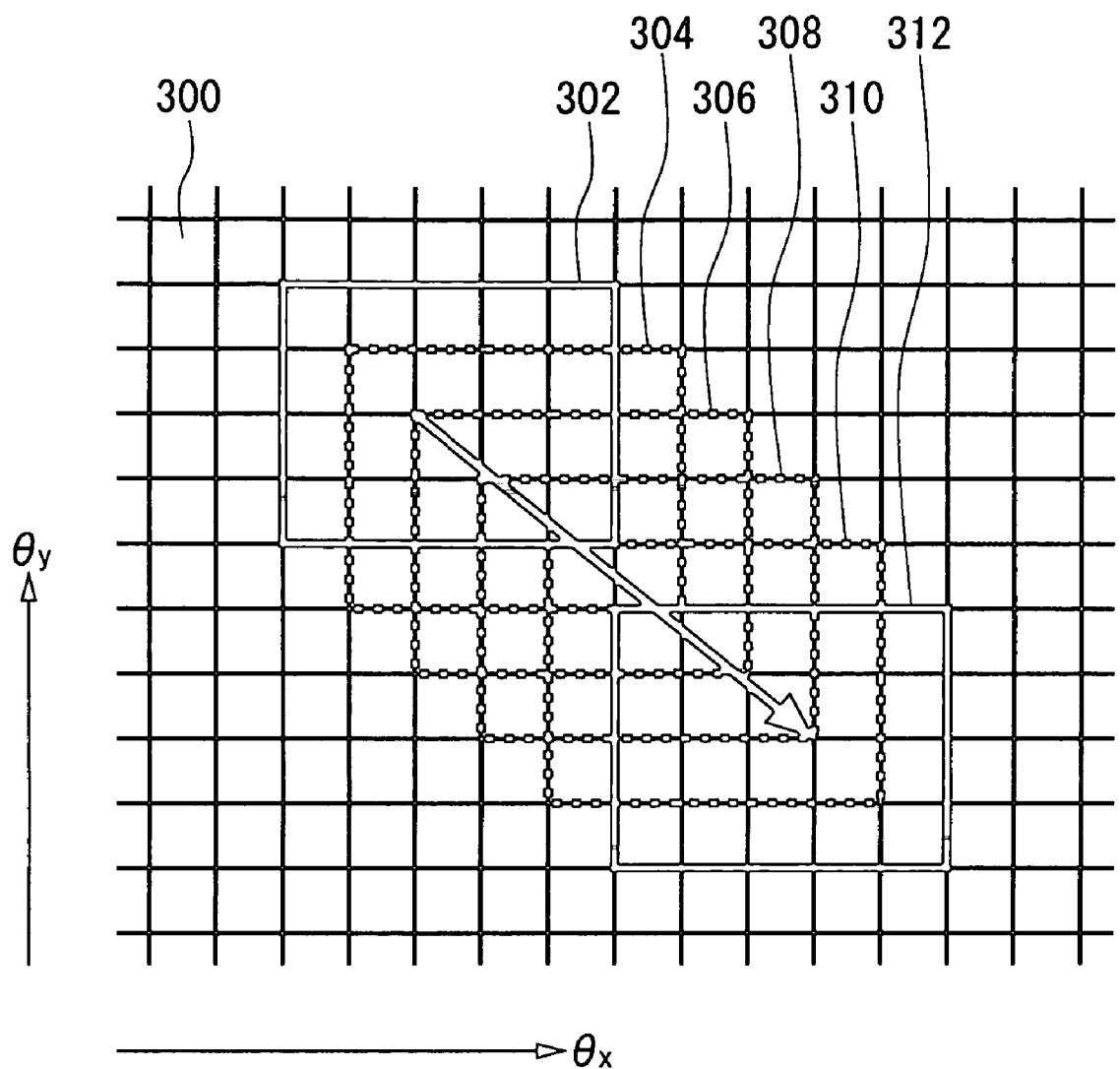
FIG. 4 shows an example of a method of exposure adjustment and white balance adjustment.

FIG. 4 shows an example of a method of exposure adjustment and white balance adjustment according to the present embodiment. A partial region 300 is a unit of pixel or a unit of block including a plurality of pixels. The light quantity storing unit 114 stores light quantity of each color of an object which is in the partial region 300 for each partial region 300. Further, image capturing regions 302, 304, 306, 308, 310, and 312 show that the image capturing region of the image capturing unit 102 slowly varies from the image capturing region 302 to the image capturing region 312 as the user changes the direction of the image capturing apparatus 100.

In the following, a method of exposure adjustment and white balance adjustment according to the present example is described. In case the user changes the direction of the image capturing apparatus 100 and thus the direction of the image capturing unit 102 is varied, the image capturing region variation detecting unit 106 detects variation in the direction of the image capturing unit 102 by the optical flow or the gyroscope. Then, the positional relationship estimating unit 110 estimates the direction of the image capturing unit 102 after the direction of the image capturing unit 102 is varied on the basis of the variation in the direction of the image capturing unit 102 detected by the image capturing region variation detecting unit 106. Then, the image capturing condition control unit 108 extracts light quantity of an object stored in the light quantity storing unit 114 which corresponds to the direction of the image capturing unit 102 estimated by the positional relationship estimating unit 110.

Specifically, the image capturing condition control unit 108 extracts light quantity of an object included in the image capturing region 304 in case the direction of the image capturing unit 102 begins to be varied from the image capturing unit 302 to the image capturing unit 304. Then, the image capturing condition control unit 108 gets a sum of the extracted light quantity and acquires brightness of the whole image capturing region 304. The image capturing condition control unit 108 controls the image capturing unit 102 by performing exposure adjustment on the basis of the acquired brightness when the image capturing region of the image capturing unit 102 becomes the image capturing region 304. Further, the image capturing condition control unit 108 gets a sum of the extracted light quantity of each color of an object and acquires color balance of the image capturing region 304. Then, the image capturing condition control unit 108 controls the image capturing unit 102 by performing white balance adjustment on the basis of the acquired color balance when the image capturing region of the image capturing unit 102 becomes the image capturing region 304.

Similarly, the image capturing condition control unit 108 makes exposure and white balance of the image capturing unit 102 successively varied on the basis of the brightness and the color balance of each image capturing region according to the successive variation in the direction of the image capturing unit 102 from the image capturing region 304 to 306, 308, 310, and 312.

As above, it is possible to perform a fast follow-up of exposure adjustment and white balance adjustment by estimating the exposure adjustment and the white balance adjustment and making them follow up on the basis of the variation in the direction of the image capturing unit 102 detected by the image capturing region variation detecting unit 106 and estimated by the positional relationship estimating unit 110, compared with performing the exposure adjustment and the white balance adjustment on the basis of an image captured after the image capturing region is varied. As a result, it is possible to reduce time captured for exposure adjustment and white balance adjustment for an object, which is in the image capturing region after the direction of the image capturing unit 102 is varied, to be completed.

Figure 5:
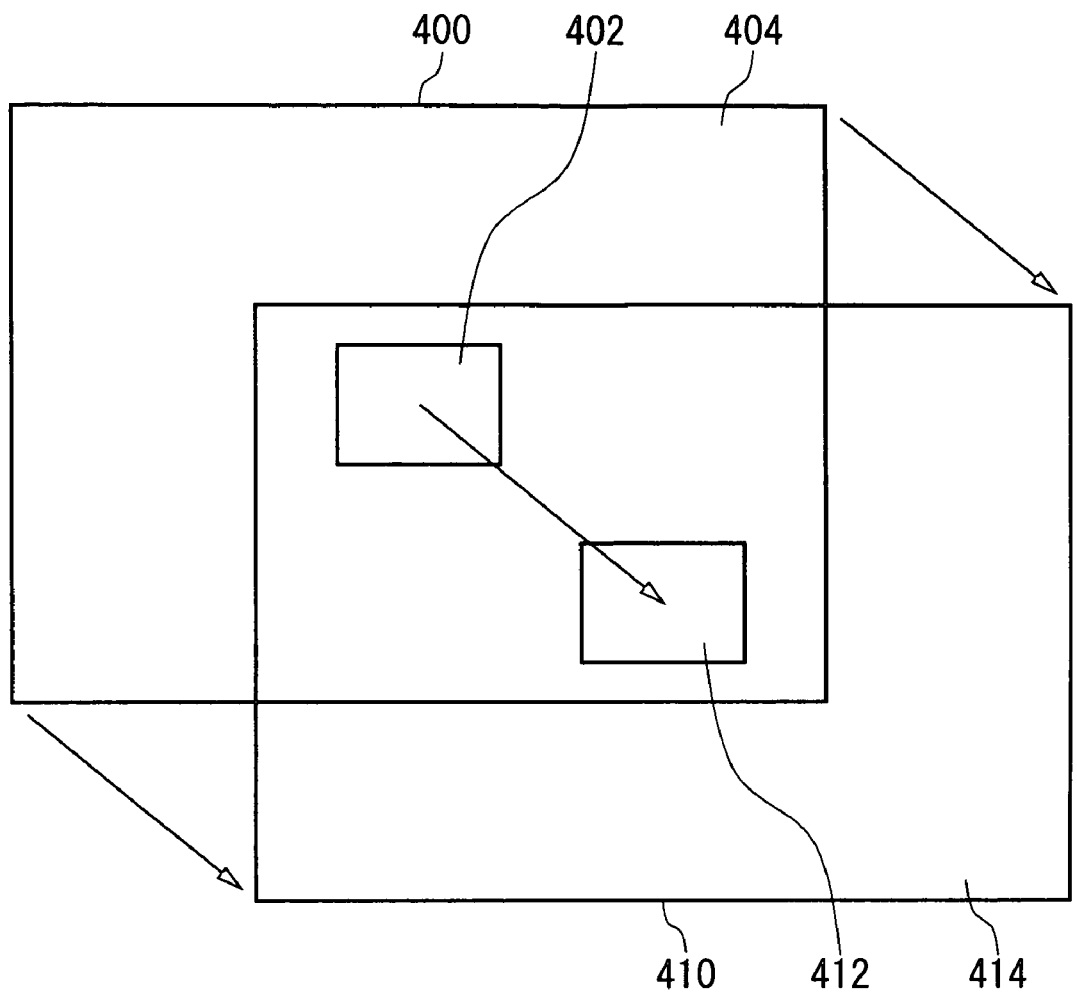
FIG. 5 shows an example of a method of exposure adjustment and white balance adjustment.

FIG. 5 shows an example of a method of exposure adjustment and white balance adjustment according to the present embodiment. Each of whole images 400 and 410 is an image of a region of an object emitting light which is received by the image capturing device included in the image capturing unit 102. Further, each of inside-zoom-images 402 and 412 is an image of a region of an object selected by the electronic zooming and looked at by the user. Further, outside-zoom-images 404 and 414 are images other than the inside-zoom-images 402 and 412 of the whole images 400 and 410, respectively. In other words, each of the inside-zoom-images 402 and 412 is an image of an object which is in the image capturing region of the present invention and each of the outside-zoom-images 404 and 414 is an image of an object which is outside of the image capturing region of the present invention In FIG. 5, the user changes the direction of the image capturing apparatus 100 and thus a whole image captured by the image capturing unit 102 is varied from the whole image 400 to the whole image 410 slowly. Further, FIG. 5 shows that the inside-zoom-image captured by the electronic zooming of the image capturing unit 102 is varied from the inside-zoom-image 402 to the inside-zoom-image 412 slowly.

In the following, a method of exposure adjustment and white balance adjustment according to the present example is described. In case the whole image 400 is captured by the image capturing device of the image capturing unit 102 and the user selects and looks at the inside-zoom-image 402, the light quantity measuring unit 112 measures light quantity of an object which is in each of a plurality of partial regions included in the whole image 400. In other words, the light quantity measuring unit 112 measures light quantity of an object which is in each of a plurality of partial regions included in the outside-zoom-image 404 in addition to light quantity of an object which is in each of a plurality of partial regions included in the inside-zoom-image 402. Then, the light quantity storing unit 114 stores the light quantity of each partial region measured by the light quantity measuring unit 112 correspondingly to the direction of the image capturing unit 102 toward the object.

In case the user changes the direction of the image capturing apparatus 100 and thus the direction of the image capturing unit 102 is varied, the image capturing region variation detecting unit 106 detects variation in the direction of the image capturing unit 102 by the optical flow or the gyroscope. Then, the positional relationship estimating unit 110 estimates the direction of the image capturing unit 102 after the direction of the image capturing unit 102 is varied on the basis of the variation in the direction of the image capturing unit 102 detected by the image capturing region variation detecting unit 106. Then, the image capturing condition control unit 108 extracts light quantity of an object stored in the light quantity storing unit 114 which corresponds to the direction of the image capturing unit 102 estimated by the positional relationship estimating unit 110.

Specifically, the image capturing condition control unit 108 extracts light quantity of an object included in the inside-zoom-image 412, that is, an object included in the outside-zoom-image 404 of the whole image 400 in case the direction of the image capturing unit 102 begins to be varied from the whole image 400 to the whole image 410. Then, the image capturing condition control unit 108 gets a sum of the extracted light quantity and acquires brightness of the whole inside-zoom-image 412. The image capturing condition control unit 108 controls the image capturing unit 102 by performing exposure adjustment on the basis of the acquired brightness when the inside-zoom-image of the image capturing unit 102 becomes the inside-zoom-image 412. Further, the image capturing condition control unit 108 gets a sum of the extracted light quantity of each color of an object and acquires color balance of the inside-zoom-image 412. Then, the image capturing condition control unit 108 controls the image capturing unit 102 by performing white balance adjustment on the basis of the acquired color balance when the inside-zoom-image of the image capturing unit 102 becomes the inside-zoom-image 412.

As above, by measuring light quantity of an object included in an outside-zoom-image in case the image capturing unit 102 captures an inside-zoom-image by using the electronic zoom, it is possible to perform proper exposure adjustment and white balance adjustment for a new inside-zoom-image on the basis of the light quantity of the object previously measured just after the direction of the image capturing apparatus 100 is varied and thus the out-side-zoom-image becomes the new inside-zoom-image. Therefore, it is possible to reduce a delay of exposure adjustment and white balance adjustment following the variation of the image capturing region and to obtain an image of good quality even in case the image is captured while the direction of the image capturing apparatus 100 is varied.

According to the present invention, it is possible to perform fast control of image capturing conditions for an object which enters an image capturing region in case the image capturing region is varied.

Although the present invention has been described by way of exemplary embodiments, it should be understood that those skilled in the art might make many changes and substitutions without departing from the spirit and the scope of the present invention which is defined only by the appended claims.

What is claimed is:

1. An image capturing apparatus comprising:
   an image capturing unit for capturing an image of an object;
   a light quantity storing unit for storing light quantity of the object which is outside of an image capturing region of said image capturing apparatus by corresponding the light quantity to a positional relationship between said image capturing unit and the object;
   an image capturing region variation detecting unit for detecting variation in the image capturing region of said image capturing unit;
   a positional relationship estimating unit for estimating a positional relationship between said image capturing unit and the object after the positional relationship between said image capturing unit and the object is varied on the basis of the variation in the image capturing region detected by said image capturing region variation detecting unit; and
   an image capturing condition control unit for controlling an image capturing condition by said image capturing unit on the basis of the light quantity stored by said light quantity storing unit, wherein the light quantity is corresponded to the positional relationship estimated by said positional relationship estimating unit.

2. An image capturing apparatus as claimed in claim 1, wherein said image capturing condition control unit controls exposure adjustment on the basis of the light quantity stored by said light quantity storing unit.

3. An image capturing apparatus as claimed in claim 1, wherein
   said light quantity storing unit stores light quantity of each color of the object which is outside of the image capturing region of said image capturing unit by corresponding the light quantity of each color to the positional relationship between said image capturing unit and the object, and said image capturing condition control unit controls white balance adjustment of said image capturing unit on the basis of the light quantity of each color stored by said light quantity storing unit.

4. An image capturing apparatus as claimed in claim 1, further comprising a light quantity measuring unit for measuring the light quantity of the object, wherein
said image capturing unit captures an inside-zoom-image which is an image in the image capturing region out of a whole image of the object by electronic zooming,
said light quantity measuring unit measures the light quantity of the object comprised by an outside-zoom-image which is the rest of the whole image except the inside-zoom-image,
said light quantity storing unit stores the light quantity of the outside-zoom-image of the object by corresponding it to the positional relationship between said image capturing unit and the object, and
said image capturing condition control unit controls the image capturing condition of said image capturing unit on the basis of the light quantity of the object comprised by the outside-zoom-image and stored by said light quantity storing unit in case the image capturing region of said image capturing unit is varied.

5. An image capturing apparatus as claimed in claim 1, further comprising a light quantity measuring unit for measuring the light quantity of the object, wherein
said light quantity storing unit stores the light quantity measured by said light quantity measuring unit in the past by corresponding it to the positional relationship between said image capturing unit and the object, and
said image capturing condition control unit controls the image capturing condition of said image capturing unit on the basis of the light quantity measured in the past and stored by said light quantity storing unit in case the image capturing region of said image capturing unit is varied.

6. An image capturing apparatus as claimed in claim 5, further comprising a light quantity estimating unit for estimating light quantity of the object after the positional relationship between said image capturing unit and the object is varied, wherein
said light quantity storing unit stores the light quantity measured by said light quantity measuring unit in the past by corresponding it to a time when said light quantity measuring unit measured the light quantity,
said light quantity estimating unit estimates the light quantity of the object after the positional relationship between said image capturing unit and the object on the basis of the light quantity measured by said light quantity measuring unit in the past and stored by said light quantity storing unit, and
said image capturing condition control unit controls the image capturing condition of said image capturing unit on the basis of the light quantity measured by said light estimating unit.

7. An image capturing apparatus as claimed in claim 1, wherein said image capturing region variation detecting unit detects the variation in image capturing region of said image capturing unit by detecting a movement of said image capturing unit.

8. An image capturing apparatus as claimed in claim 1, wherein
said image capturing unit captures a plurality of images successively, and
said image capturing region variation detecting unit detects the variation in image capturing region of said image capturing unit by comparing the plurality of images captured successively by said image capturing unit.

9. An image capturing apparatus as claimed in claim 1, wherein
said light quantity storing unit stores light quantity for an object which is outside of the image capturing region of said image capturing unit by corresponding it to a direction of said image capturing unit,
said image capturing region variation detecting unit detects a variation in the direction of said image capturing unit,
said positional relationship estimating unit estimates the direction of said image capturing unit after the direction of said image capturing unit is varied on the basis of the variation of the direction of said image capturing unit detected by said image capturing region variation detecting unit, and
said image capturing condition control unit controls the image capturing condition of said image capturing unit on the basis of the light quantity of the object, which is outside of the image capturing region of said image capturing unit, stored by said light quantity storing unit and corresponded to the direction of said image capturing unit estimated by said positional relationship estimating unit.

10. An image capturing method comprising steps of:
storing light quantity of an object which is outside of an image capturing region of an image captured by an image capturing apparatus in a light quantity storing unit by corresponding the light quantity to a positional relationship between the image capturing apparatus and the object;
detecting a variation in the image capturing region of the image capturing apparatus;
estimating the positional relationship between the image capturing apparatus and the object after the image capturing region of the image capturing apparatus is varied on the basis of the variation in the image capturing region detected;
controlling an image capturing condition of the image capturing apparatus on the basis of the light quantity stored in the light quantity storing unit and corresponded to the estimated positional relationship; and
capturing an image of the object on the basis of the image capturing condition.

* * * * *